(12) United States Patent
Harish et al.

(10) Patent No.: US 12,353,873 B2
(45) Date of Patent: Jul. 8, 2025

(54) METHODS CIRCUITS DEVICES SYSTEMS AND FUNCTIONALLY ASSOCIATED MACHINE EXECUTABLE CODE FOR RECOMMENDATION AND DISTRIBUTION OF DIGITAL CONTENT

(71) Applicant: IRONSOURCE LTD., Tel Aviv (IL)

(72) Inventors: Arnon Harish, Tel Aviv (IL); Sagi Ben Basat, Tel Aviv (IL)

(73) Assignee: Unity Technologies SF, San Francisco, CA (US)

( * ) Notice: Subject to any disclaimer, the term of this patent is extended or adjusted under 35 U.S.C. 154(b) by 610 days.

(21) Appl. No.: 17/301,134

(22) Filed: Mar. 26, 2021

(65) Prior Publication Data
US 2021/0286617 A1 Sep. 16, 2021

Related U.S. Application Data

(63) Continuation-in-part of application No. 15/234,324, filed on Aug. 11, 2016, now Pat. No. 11,716,400.

(60) Provisional application No. 62/203,402, filed on Aug. 11, 2015.

(51) Int. Cl.
G06F 8/71 (2018.01)
G06F 8/65 (2018.01)
H04L 67/00 (2022.01)

(52) U.S. Cl.
CPC .............. G06F 8/71 (2013.01); G06F 8/65 (2013.01); H04L 67/34 (2013.01)

(58) Field of Classification Search
CPC ......... H04L 67/34; H04L 67/10; H04L 67/02; H04L 69/329; H04L 67/12; G06F 8/65; G06F 8/71; G06F 8/61; G06F 8/60; G06F 9/44505
See application file for complete search history.

(56) References Cited

U.S. PATENT DOCUMENTS

| | | | | |
|---|---|---|---|---|
| 8,856,685 B2* | 10/2014 | Liu | ...................... | G06F 16/9566 715/764 |
| 8,977,723 B2* | 3/2015 | Quan | ...................... | H04L 65/61 709/219 |
| 9,020,446 B2 | 4/2015 | Manssen et al. | | |
| 9,311,070 B2* | 4/2016 | Bennah | ...................... | G06F 8/63 |
| 11,698,825 B2* | 7/2023 | Mackenzie | ............... | G06F 8/61 719/330 |

(Continued)

OTHER PUBLICATIONS

International Application # PCT/IB2022/052708 Search Report dated Jul. 11, 2022.

*Primary Examiner* — Fadi Haj Said
(74) *Attorney, Agent, or Firm* — Meitar Patents Ltd.; Daniel Kligler

(57) ABSTRACT

Disclosed is a content distribution system including a content server communicatively coupled to a data packet network and running one or more server-side components. A mobile computing device also communicatively coupled to the data packet network and running a client-side component may be configured to: (a) receive from said one or more server-side components a mobile device operational scenario definition; (b) activate or configure one or more monitoring routines in accordance with the device operational scenario definition; and (c) monitor said mobile computing device for an occurrence of the defined operating scenario using the activated or configured monitoring routines.

20 Claims, 7 Drawing Sheets

(56) References Cited

U.S. PATENT DOCUMENTS

| | | | |
|---|---|---|---|
| 2006/0230154 A1* | 10/2006 | Nguyenphu | H04L 67/55 709/227 |
| 2006/0240822 A1* | 10/2006 | Jiang | H04W 8/12 455/433 |
| 2007/0067730 A1* | 3/2007 | Ito | B41J 3/46 715/764 |
| 2008/0071761 A1 | 3/2008 | Singh et al. | |
| 2009/0315767 A1 | 12/2009 | Scalisi et al. | |
| 2010/0052930 A1 | 3/2010 | Grigsby et al. | |
| 2011/0083025 A1 | 4/2011 | Lee | |
| 2011/0093295 A1* | 4/2011 | Mankad | G16H 10/60 705/500 |
| 2011/0153426 A1 | 6/2011 | Reddy et al. | |
| 2012/0084344 A1* | 4/2012 | Kalyanasundaram | H04W 92/24 709/203 |
| 2012/0222025 A1* | 8/2012 | Pandit | G06F 8/658 717/170 |
| 2012/0284704 A1 | 11/2012 | Friedman et al. | |
| 2012/0303517 A1 | 11/2012 | Kang | |
| 2012/0330690 A1* | 12/2012 | Goslinga | G06Q 40/00 705/4 |
| 2013/0111511 A1 | 5/2013 | Besehanic | |
| 2013/0211908 A1 | 8/2013 | Yuill et al. | |
| 2013/0215846 A1 | 8/2013 | Yerrabommanahalli et al. | |
| 2014/0052542 A1* | 2/2014 | Zhang | G06Q 30/0269 705/14.66 |
| 2014/0095667 A1* | 4/2014 | Quan | H04L 67/06 709/219 |
| 2014/0101428 A1* | 4/2014 | Bennah | G06F 8/63 713/100 |
| 2014/0101429 A1* | 4/2014 | Bennah | G06F 11/2289 713/100 |
| 2014/0101431 A1* | 4/2014 | Bennah | G06F 8/63 713/100 |
| 2014/0253377 A1 | 9/2014 | Scalisi et al. | |
| 2014/0366016 A1* | 12/2014 | Wang | G06F 8/61 717/178 |
| 2014/0368601 A1* | 12/2014 | deCharms | H04N 7/148 348/14.02 |
| 2015/0058679 A1* | 2/2015 | Jackson | G06F 9/44552 714/47.2 |
| 2015/0058767 A1* | 2/2015 | Huang | G06F 3/04842 715/765 |
| 2015/0065167 A1 | 3/2015 | Scalisi | |
| 2015/0081532 A1 | 3/2015 | Lewis et al. | |
| 2015/0120421 A1 | 4/2015 | Deshpande et al. | |
| 2015/0149634 A1* | 5/2015 | Nassaur | G06F 9/5072 709/226 |
| 2015/0223186 A1 | 8/2015 | Pierrel et al. | |
| 2015/0248712 A1 | 9/2015 | Lacy-Hulbert et al. | |
| 2015/0262069 A1 | 9/2015 | Gabriel et al. | |
| 2015/0289120 A1 | 10/2015 | Harber et al. | |
| 2015/0309791 A1* | 10/2015 | Bennah | G06F 8/65 717/121 |
| 2015/0310493 A1 | 10/2015 | Chitnis | |
| 2015/0317761 A1* | 11/2015 | Lee | G06Q 30/02 701/465 |
| 2016/0191554 A1* | 6/2016 | Kaminsky | H04L 63/1425 726/23 |
| 2016/0202078 A1 | 7/2016 | Scalisi et al. | |
| 2016/0286345 A1* | 9/2016 | Macdonald | H04W 52/0229 |
| 2016/0301764 A1 | 10/2016 | Ruback | |
| 2016/0371750 A1 | 12/2016 | Peddinti et al. | |
| 2017/0048355 A1* | 2/2017 | Harish | H04L 67/535 |
| 2017/0061136 A1* | 3/2017 | Fung | G06F 21/6218 |
| 2017/0078377 A1* | 3/2017 | Smith | H04L 67/34 |
| 2017/0094057 A1 | 3/2017 | Naiga et al. | |
| 2017/0102976 A1* | 4/2017 | Nandakumar | G06F 8/60 |
| 2017/0214701 A1 | 7/2017 | Hasan | |
| 2017/0308367 A1* | 10/2017 | Clothier | G06F 8/61 |
| 2018/0191909 A1* | 7/2018 | Mattes | H04L 65/1069 |
| 2018/0300180 A1* | 10/2018 | Shepard | G06F 8/65 |
| 2019/0095786 A1 | 3/2019 | Carbune et al. | |
| 2019/0129705 A1* | 5/2019 | Bulut | G06F 21/577 |
| 2019/0224863 A1* | 7/2019 | Robinson | G06F 3/016 |

* cited by examiner

METHODS CIRCUITS DEVICES SYSTEMS AND FUNCTIONALLY ASSOCIATED MACHINE EXECUTABLE CODE FOR RECOMMENDATION AND DISTRIBUTION OF DIGITAL CONTENT

FIELD OF THE INVENTION

The present invention generally relates to the field of wireless communication. More specifically, the present invention relates to methods, circuits, devices, assemblies and systems for digital content recommendation and distribution.

BACKGROUND

The ubiquitous mobile communication devices of today, such as smartphones, tablets, wearable computers and laptops, have evolved into powerful computing and content presentation devices capable of rendering and presenting highly rich, interactive and engaging content. These devices are now also capable of running a broad range of software applications, even highly resource demanding applications that previously could only be run on a desktop computer.

Software applications for mobile computing devices already number in the millions, and this number is growing monthly. Applications are available on numerous online marketplaces including: Apple's App Store, Google Play, Amazon, etc. Literally, billions of people all around the world are installing and running software applications, of various types and for various purposes, on an almost constant basis.

Likewise, billions of people are regularly consuming online content and engaging with online content services, such as: news publications, music and video streaming, online games, online banking and e-commerce. Since a primary function of many applications is to present complex and interactive content, and since at the same time core functionality of many other applications is being moved online, to cloud computing platforms, the line between digital content and applications is becoming more and more blurred. Accordingly, both software applications and content from online content services may be referred to as digital content.

The extremely large number of applications and immense body of other digital content available for mobile devices may be overwhelming and may actually cause confusion with some mobile communication device users. In some cases, users may find it daunting to search through the huge number of options, and may simply avoid looking for digital content which in fact may be very useful for them.

Therefore, there is a need in the field of digital content distribution for improved methods, circuits, devices, systems, and functionally associated machine executable for automatically for recommending and delivering digital content to mobile communication devices.

SUMMARY OF INVENTION

Embodiments of the present invention include methods, circuits, devices, systems and functionally associated machine executable code for selective recommendation and distribution of digital content. The phrase "selective recommendation and distribution" may include selection and distribution based on a wide variety of parameters relating to a condition of a target device, activities performed by a user of the target device and/or some combination of device attributes and user actions. The term digital content, for purposes of this application, may mean any one or some combination of the following: (a) downloaded content in text, audio and/or video format, (b) streamed audio or video content, (c) interactive content from an online source or website, (d) downloaded and installed software applications, and/or (e) non-installed applications running in a browser, or other runtime environment or sandbox.

A system according to some embodiments, may include both server-side components and client-side components, either of which types of components may each function independently and substantially autonomously at least part of the time, and may synchronize and collaborate with one another intermittently. The client-side components may be integral, installed or otherwise functionally associated with an operating system of a mobile communication device, such as a cellphone, smartphone, tablet, wearable computer or laptop. The server-side components may be integral, installed or otherwise functionally associated with a digital content/application server.

Viewing the server-side and client-side components as constituent elements of a loosely integrated system, a generalized description of the rolls played by server-side components may be to perform relatively higher load data processing required by the system for decision making and or policy setting purposes. Server-side components according to embodiments of the present invention may also be assigned rolls requiring consistent connectivity to the internet.

Client-side components according to embodiments of the present invention may gather and share data relating to the component host communication device's environment, condition, recent activities and various other specific device attributes including, for example, operating system and operational capabilities. Client-side components may share collected information with other client-side components and or with corresponding server-side components. Client-side components according to embodiments of the present invention may also execute specific functions relating to retrieving or otherwise receiving content recommendations, and/or the underlying recommended content itself, from the server-side components and/or from repositories associated with the server-side components. Client-side components according to embodiments may execute functions to render audio or video content recommendations on their respective host devices for their respective users. The client-side components may execute functions or otherwise generate and/or facilitate notifications relating to recommended content for users of their respective host devices. The client-side components may facilitate retrieval and/or installations of recommended content, such as for example recommended content which was accepted by a user, onto a host device or onto other devices controlled by the host device.

Server-side components, running on server(s), physical or virtual, at a network operator's facilities/cloud-service-facilities, may select and communicated to the client-side components which recommendations to render and/or which commands to execute by the client-side device on the device host. Selection of content may be based on a variety of factors including recently released content, recently installed operating systems on the client-side host device, and recent specific executed function and actions performed on the client-side host device. The server-side components may, according to embodiments, communicate instructions to associated content for presentation to users by the client-side components. The client-side components may attempt to execute all requested instructions and may communicate execution instruction results to the server-side components, over the same or functionally associated network. Collectively, the client and server side components may function as a system to: (a) enable a digital content provider to define and/or author one or more mobile communication device operational scenarios, wherein each device operational scenario may be indicative of host device suitability for a specific digital content item; (b) distribute the one or more operational scenarios, optionally in the form of a configuration file, to each of a set of mobile communication devices; (c) monitor each of the set of communication devices for an occurrence of one or more of the distributed operational scenarios; and (d) upon detection of an occurrence of a specific operational scenario associated with a specific digital content item, execute a content recommendation/distribution/installation procedure, which procedure may optionally be encoded within the same or a related configuration file, for specific digital content item(s) associated with the detected operational scenario.

According to embodiments of the present invention, an operational scenario of a mobile device may include a condition of the mobile communication device, for example: (a) an amount of available memory; (b) an amount of available storage; (c) available battery; (d) computational load on one or more of the device processors; (e) connectivity available to the device; (f) the presence or absence of specific software on the device; (g) a date, time of day or combination of the two; and/or (h) a location of the device. A mobile device operational scenario may also include an action or series of actions performed by a device user, for example: (a) picking up the device; (b) placing the device down in a specific orientation; (c) plugging or unplugging headphones from the device; (d) plugging or unplugging the device from a charger; (e) connecting the device with other devices using Bluetooth or WiFi; and/or (f) installing, uninstalling, activating or deactivating specific applications or applications of a specific application type. According to yet further embodiments of the present invention, a mobile device operational scenario may be defined as some combination, series or trend of detected conditions or actions which have been detected, optionally detected in some specific sequence and or over some specific period of time.

A device operational scenario may be defined by a content provider (e.g. content producer, distributor, promoter, etc.) of digital content in connection with, optionally as a trigger for, the recommendation and/or distribution of one or more specific digital content items. A specific operational scenario may be associated with some specific content, and detection of an occurrences of the specific operational scenario on a client device may trigger a recommendation of the specific content to a user of the device via the client device. Alternatively, an operational scenario may be associated with a set of client device operations to be executed upon detection of the operational scenario, which set of operations when executed may place the client device into one or more specific operational states.

An operational scenario may be transmitted through a file or other data structure within which the device operational scenario definition may be encoded. The operational scenario, file or data structure, may be authored using one or more server-side software component of a system according to embodiments of the present invention. The file or data structure within which the operational scenario is encoded may also include a definition of one or more procedures to execute upon detection of an occurrence of the encoded operational scenario.

An authored operational scenario file or data structure, with encoded device operational scenario parameters/instructions, may be conveyed to each of a set of target devices running a client-side system component according to embodiments of the present invention. A given file may be pre-loaded onto the device, either pre-loaded by the manufacturer or by a reseller (e.g. network operator), or by an agent of either. The given file may be loaded onto the device either before or after purchase. After purchase, the file may be pushed to the device or pulled by the device during activation, and or pulled by the client-side components on the device in response to detection of some specific scenario.

One or more client-side components may be a software component which may be referred to as the Content Recommendation & Distribution System Client-Side Manager. The monitoring routines the Manager instances, otherwise triggers or simply regulates, may be referred to as Device Monitoring Agents ("DMA"). The Manager and Monitoring Agent functionality may be provided by the same software or by related software running on the client device.

A client-side software component running on a client device, such as for example a Client-Side Manager ("CSM"), upon receiving a specific file or data structure, may load, activate and/or configure specific device monitoring routines corresponding to the device operational scenario encoded in the specific file or data structure. The client-side component running on a given mobile communication device according to embodiments may receive each of several device operational scenario files/routines and may activate monitoring routines, in the form of Device Monitoring Agents (DMA's), on the given communication device for each of several device operational scenario files/routines. Upon detection of a specific device operational scenario, the client-side device may execute a specific set of instructions (e.g. to present, recommend or install specific content) associated with the detected specific device operational scenario. The instructions for execution, along with corresponding content, may be encoded in the same or in an associated file/data-structure as the one including the operational scenario definition, or the instructions and/or content may be provided by a server-side component responsive to the server-side component receiving an indication of a detection of an occurrence of a specific scenario from the client-side component.

Execution instructions provided to, and executed by, a client-side software component according to embodiments may include instructions to: (a) render and/or present to a user of the device specific content (e.g. notifications, recommendations, digital ads, etc.) which may either have been preloaded or needs to be retrieved from a server-side component; (b) download specific digital content; and/or (c) install, with or without device user approval, specific digital content. A digital content item according to embodiments of the present invention may include: (a) a software application; (b) configuration data for a software application; (c) a link to download a software application; (d) a notification; (e) a multimedia file or stream; (f) a digital ad including a link to an online service; and/or (g) a digital ad to for a physical retailer.

A digital content recommendation and distribution system according to further embodiments may also monitor and report mobile device user responses to specific digital content recommendations. According to yet further embodiments, a digital content recommendation and distribution system may monitor and report mobile device user consumption of usage of specific digital content recommend and/or otherwise provided through the system.

Embodiments of the present invention may include methods, circuits, devices, systems and functionally associated machine executable code for generating and delivering user specific recommendations to mobile communication devices. According to some embodiments, there may be provided a content recommendation server receiving, from each of a set of mobile communication devices, device related information generated by a Device Monitoring Agent (DMA) running on respective devices. Information received from each DMA about its respective mobile communication device may include the respective device's: (a) application inventory; (b) available storage; (c) make and model; and (d) general operational status. As part of the operational status reported, the DMA may include information about the device's operating system (OS), OS version and recent OS changes. The DMA may be configured to specifically generate and send to the recommendation server an OS update notification each time its respective device undergoes an OS update, upgrade or downgrade or changeover to a different OS version.

Embodiments of the present inventions may include various techniques, data structures and machine executable code for detecting a change in version of a host device's operating system. One technique uses intermittent calls from the DMA to the host devices operating system asking for a current operating system version. By comparing the operating system's current response against previous response, as saved in non-volatile memory, OS version changes can be identified. Various other techniques can be utilized for identifying host device OS changes. Each and every such technique, known today or to be devised in the future, may be applicable to the present invention.

According to embodiments of the present invention, there may be provided an architecture and processes for a recommendation server which may include functional modules for: (a) receiving an OS update notification; (b) checking for new applications and application versions relevant to the new OS version; (c) delivering recommendations to install applications found to be relevant; and (d) recording applications deployed or otherwise selected new apps on the client device. According to further embodiments, the content recommendation server may be configured to, responsive to receiving information about the changed OS version, generate a set of new content recommendations for the device whose operating system has been updated, upgraded or otherwise changed to the different OS version. The set of one or more newly recommended content items may be a set of applications which may or may not already be installed on the mobile communication devices but which were specifically designed to utilize a new or improved OS feature or capability, newly added or improved with the newly installed OS version.

A content recommendation system according to embodiments of the present invention may include and keep updated an inventory of software applications for possible recommendation to client devices, wherein the data for each application in the inventory may also include OS version specific information about version specific added features and version specific feature enhancements. When a recommendation server in accordance with embodiments of the present invention receives an indication that a specific monitored device has had an OS version change, the recommendation server may check whether one or more of the applications listed in inventory has an added or improved feature associated with the changed OS version. In the event that such an addition or improvement is listed, the recommendation server may prioritize for recommendation to the device with the changed OS version the application with that application version with the added/improved features.

Upon receiving new content recommendations from the content server recommendation system, a Client-Side Content Manager according to embodiments may present to a device user, as installation recommendations, the newly recommended content items. According to further embodiments, presentation of the newly recommended content items may be performed by server-side components interacting with the device user through a web-browser running on the device. User selection detection may also be performed by the server-side components via the same web browser as used to present the recommended content. Upon receiving a user confirmation regarding installation of one or more of the recommended items, a client-side manager may activate a client-side (content) installer application to install the selected content items. The installer may receive the content items to be installed directly from the server-side components, or it may receive a pointer to the storage location where the to be installed content is stored.

According to embodiments where the operational scenario triggering new content recommendations is a change in OS the content recommendation module may store or retain access to multiple OS specific versions of content in order to support both OS updates and OS reversions. Content recommendations resulting from detection of recently changed OS versions, updates or reversions, may also include links to retrieve the content and possibly configuration data required from proper installation of the content. Configuration data for a given application may be user device specific and may have been derived from a previous installation of the application by the specific user. The user specific configuration data may be stored either on the server-side or on the user device and may be used to install and deploy a newer or older version of an application, depending on if the OS changes was forward or backward, transparently to the device user.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
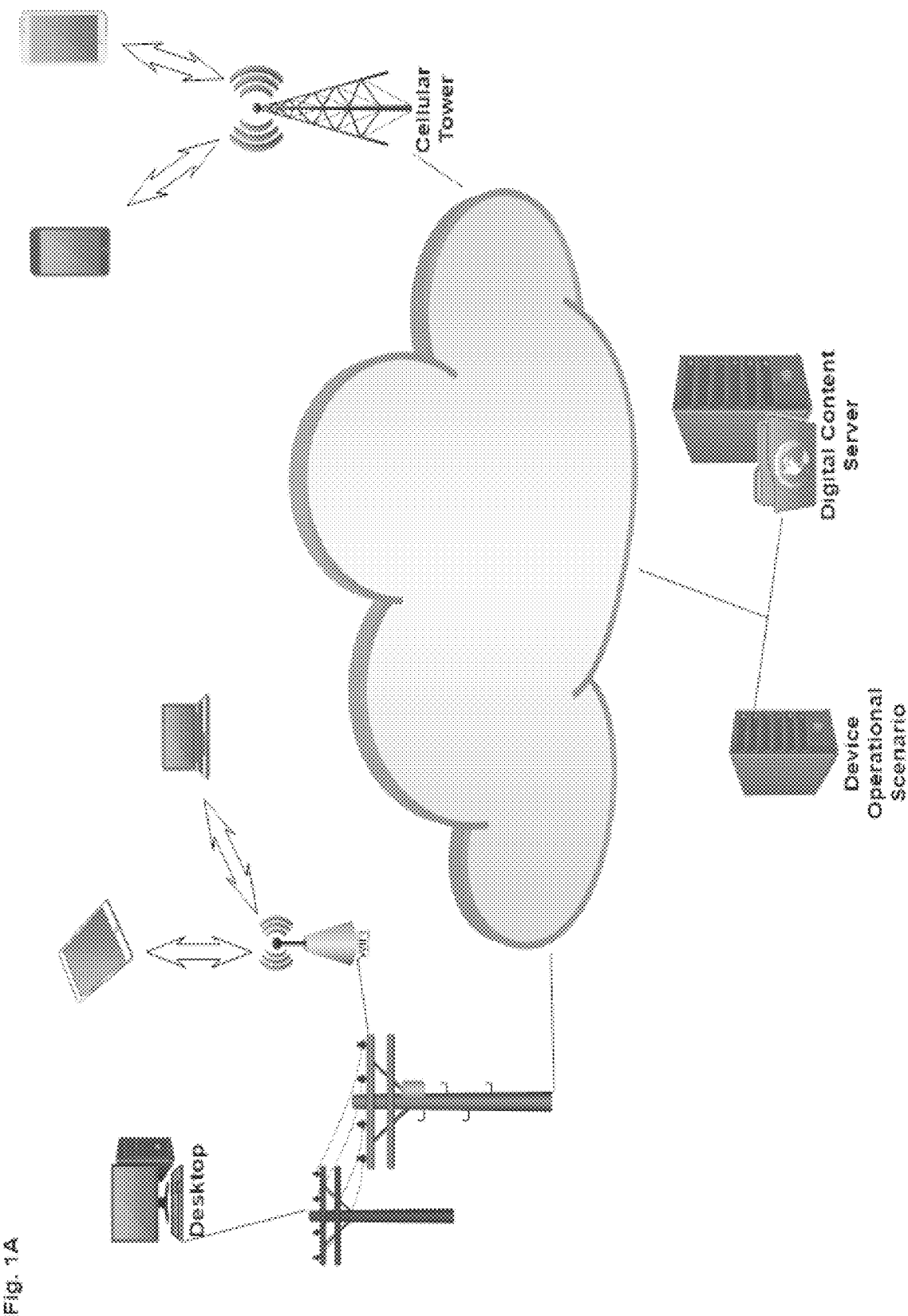
FIG. 1A shows an illustration of an exemplary data packet distribution network with wired, wireless and cellular network access points, and including networked devices communicating through the network with servers configured according to embodiments of the present invention, such that collectively there is formed a content recommendation and distribution system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE FIGURES

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

The present invention includes methods, circuits, devices, systems and functionally associated machine executable code for recommendation and distribution of digital content. The term digital content, for purposes of this application, may mean any one or combination of the following: (a) downloaded content such audio and video, (b) streamed content, (c) interactive content from an online source or website, (d) downloaded and installed application, and/or (e) a non-installed application running in a browser, or other runtime environment or sandbox. A system according to some embodiments, may include both server-side components and client-side components, which components may each function independently and substantially autonomously part of the time, and may synchronize with one another intermittently. The client-side components may be integral, installed or otherwise functionally associated with an operating system of a mobile communication device, such as a cellphone, smartphone, tablet, wearable computer or laptop. The server-side components may be integral, installed or otherwise functionally associated with a digital content/application server. The server-side components may communicate execution instructions and associated content for presentation to the client-side components, while the client-side components may communicate execution instruction results to the server-side components, over the same network. Collectively, the client and server side components may function as a system to: (a) enable a digital content provider to define and/or author one or more mobile communication device operational scenarios, wherein each device operational scenario may be indicative of device user suitability for a specific digital content item; (b) distribute the one or more operational scenarios, optionally in the form of a configuration file, to each of a set of mobile communication devices; (c) monitor each of the set of communication device for an occurrence of one or more of the distributed operational scenarios; and (d) upon detection of an occurrence of a specific operational scenario associated with a specific digital content item, executing a content recommendation/distribution procedure, which procedure may optionally be encoded within the same or a related configuration file, for the specific digital content item associated with the detected operational scenario.

According to embodiments of the present invention, a mobile device operational scenario may include a condition of the mobile communication device, for example: (a) an amount of available memory; (b) an amount of available storage; (c) available battery; (d) computational load on one or more of the device processors; (e) connectivity available to the device; (f) the presence or absence of specific software on the device; (g) a date, time of day or combination of the two; and/or (h) a location of the device. A mobile device operational scenario may also include an action or series of actions performed by a device user, for example: (a) picking up the device; (b) placing the device down in a specific orientation; (c) plugging or unplugging headphones from the device; (d) plugging or unplugging the device from a charger; (e) connecting the device with other devices using Bluetooth or Wi-Fi; and/or (f) installing, uninstalling, activating or deactivating specific applications or applications of a specific application type.

A device operational scenario may be defined by a provider (e.g. producer, distributor, promoter, etc.) of digital content in connection with the recommendation and/or distribution of one or more specific digital content items. A file or other data structure within which a device operational scenario definition may be encoded may be authored using a server-side software component of a system according to embodiments of the present invention. The file or data structure may also include a definition of a procedure to execute upon detection of an occurrence of the encoded operational scenario. An authored file or data structure, with encoded device operational scenario parameters/instructions, may be conveyed to each of a set of target devices running a client-side system component according to embodiments of the present invention. A given file may be pre-loaded with the device, by the manufacturer or a reseller (e.g. network operator), before purchase, pushed to the device or pulled by the device during activation, and or pulled by the client-side components on the device in response to detection of some specific scenario.

A client-side component, upon receiving a specific file or data structure, may load, activate and/or configure specific device monitoring routines corresponding to the device operational scenario encoded in the specific file or data structure. A client-side component running on a given mobile communication device according to embodiments may receive each of several device operational scenario files/routines and may activate monitoring routines on the given communication device for each of several device operational scenario files/routines. Upon detection of a specific device operational scenario, the client-side device may execute a specific set of instructions (e.g. to present, recommend or install specific content) associated with the detected specific device operational scenario. The instructions for execution, along with corresponding content, may be encoded in the same or in an associated file/data-structure as the one including the operational scenario definition, or the instructions and/or content may be provided by a server-side component responsive to the server-side component receiving an indication of a detection of an occurrence of a specific scenario from the client-side component.

Execution instructions provided to, and executed by, a client-side software component according to embodiments may include instructions to: (a) render and/or present to a user of the device specific content (e.g. notifications, recommendations, digital ads, etc.) which may either have been preloaded or needs to be retrieved from a server-side component; (b) download specific digital content; and/or (c) install, with or without device user approval, specific digital content. A digital content item according to embodiments of the present invention may include: (a) a software application; (b) configuration data for a software application; (c) a link to download a software application; (d) a notification; (e) a multimedia file or stream; (f) a digital ad including a link to an online service; and/or (g) a digital ad to for a physical retailer.

A digital content recommendation and distribution system according to further embodiments may also monitor and report mobile device user responses to specific digital content recommendations. According to yet further embodiments, a digital content recommendation and distribution system may monitor and report mobile device user consumption of usage of specific digital content recommend and/or otherwise provided through the system.

Figure 1B:
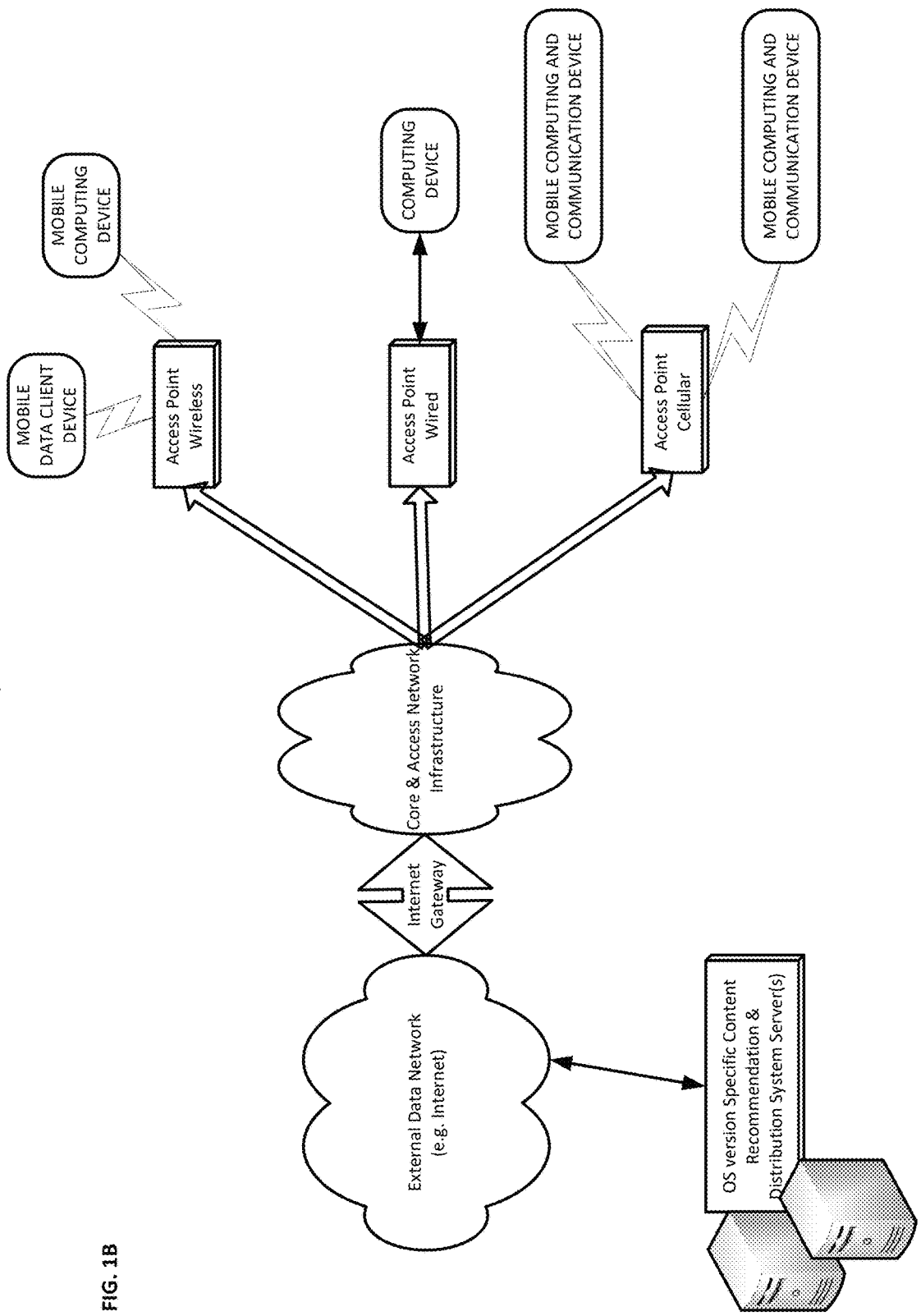
FIG. 1B shows a functional block diagram of an exemplary data packet distribution network with wired, wireless and cellular network access points, and including networked devices communicating with servers that are connected to the network through an Internet Gateway and configured according to embodiments of the present invention.

Turning now to FIG. 1A, there is shown an illustration of an exemplary data packet distribution network with wired, wireless and cellular network access points, and including networked devices communicating through the network with servers configured according to embodiments of the present invention, such that collectively there is formed a content recommendation and distribution system according to embodiments of the present invention. FIG. 1B shows a functional block diagram of the exemplary data packet distribution network with wired, wireless and cellular network access points, and including networked devices communicating with servers that are connected to the network through an Internet Gateway and configured according to embodiments of the present invention. According to such an embodiment, the content recommendation and distribution system may be independent of any network operator. It could be part of a marketplace or platform on the internet and open to multiple content providers and/or promoters. Client-side software components according to such an embodiment may be downloaded or pre-installed by the device producer, distributor or retailer.

Figure 1C:
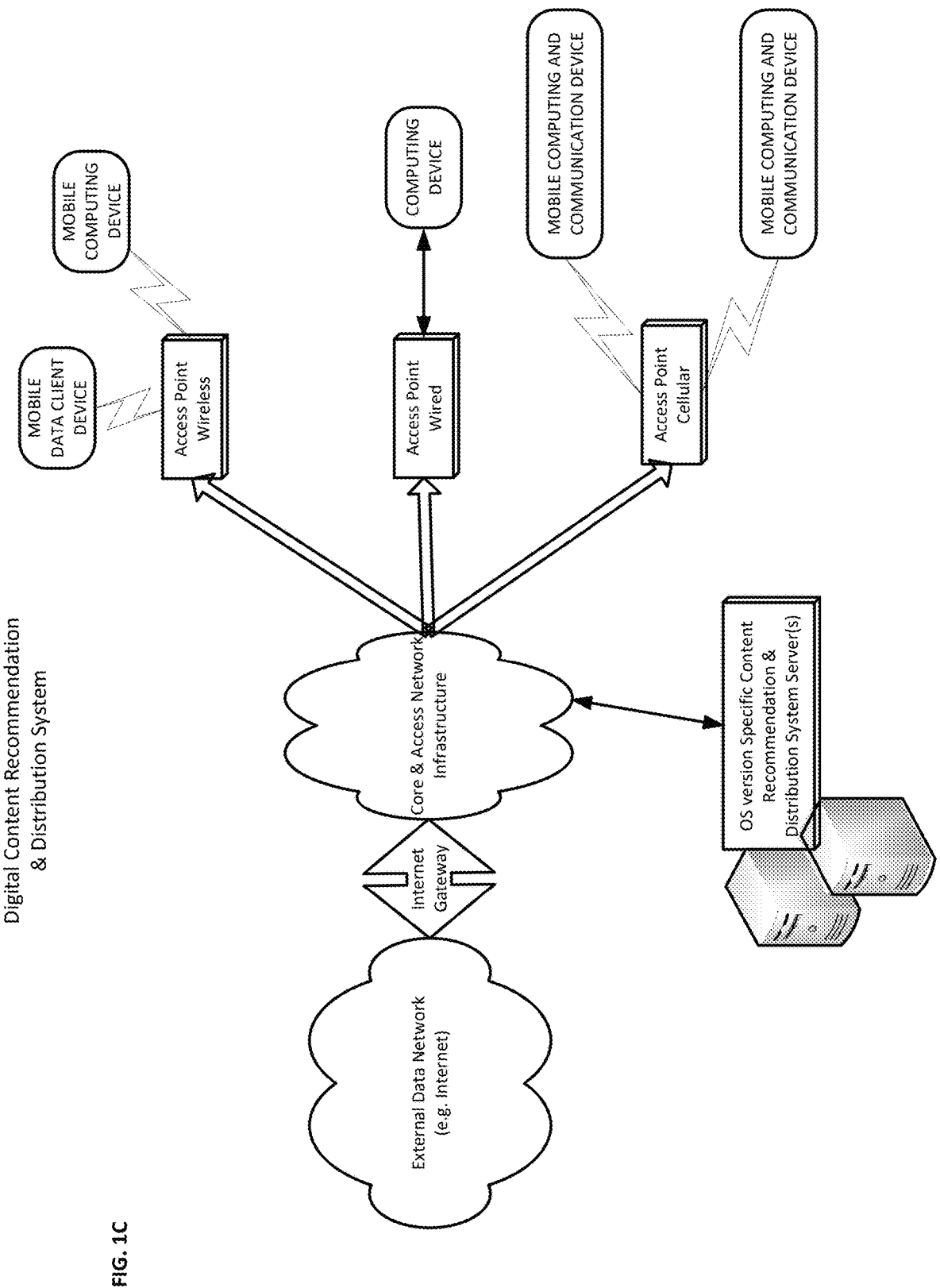
FIG. 1C shows a functional block diagram of an exemplary data packet distribution network with wired, wireless and cellular network access points, and including networked devices communicating with servers connected directly into the network and configured according to embodiments of the present invention.

Turning now to FIG. 1C, there is shown a functional block diagram of an exemplary data packet distribution network with wired, wireless and cellular network access points, and including networked devices communicating with servers connected directly into the network and configured according to embodiments of the present invention. According to such an embodiment, the content recommendation and distribution system may be controller by the network operator. It could be part of a proprietary marketplace or platform controlled by the operator. Client-side software components according to such an embodiment may be pushed to, or pre-installed on, the device by the operator. The system may provide a platform for the operator to help a user customize their devices. It may provide the operator with the ability to promote services, applications and to push advertising.

Figure 2A:
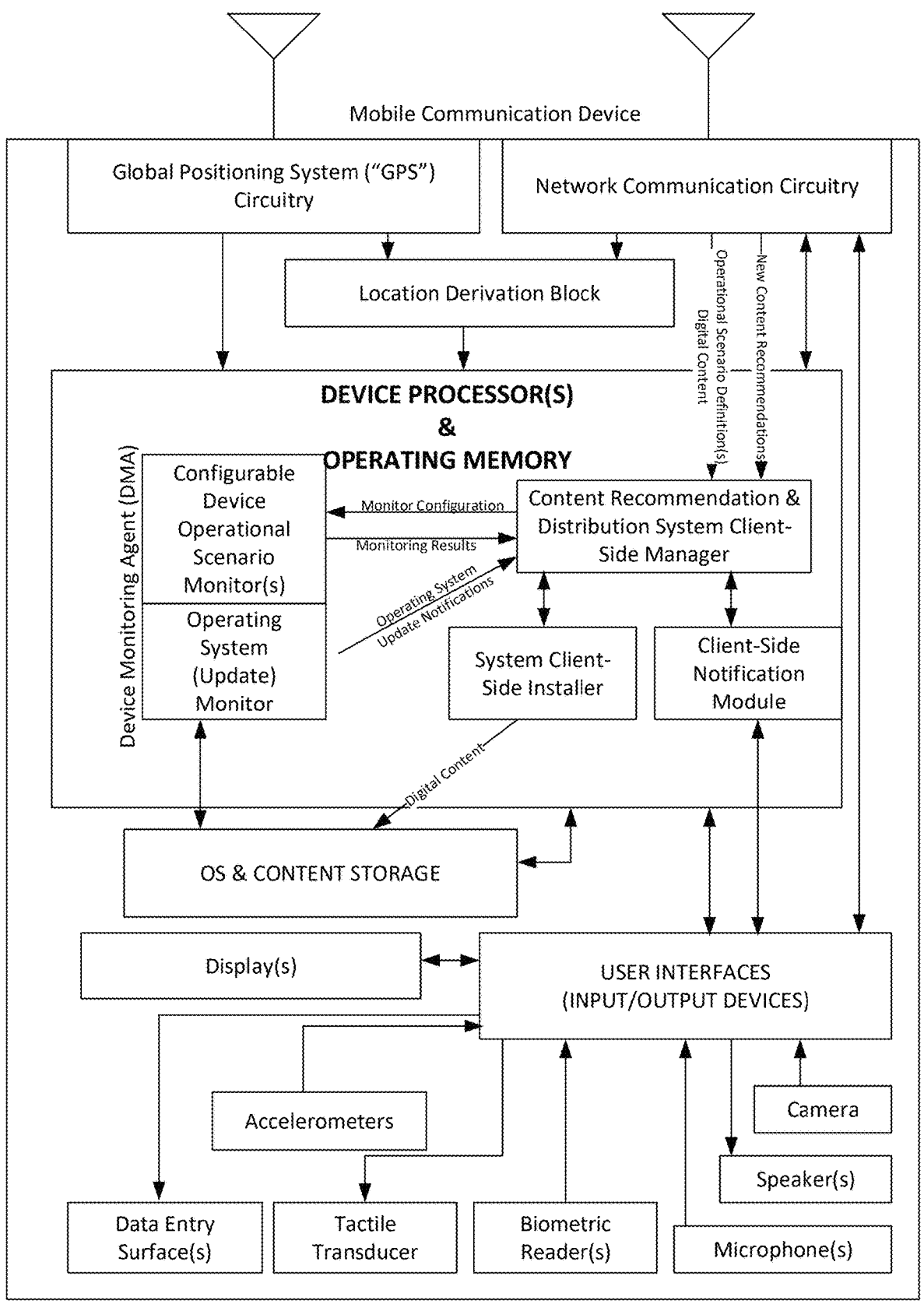
FIG. 2A is a functional block diagram of a communication device according to embodiments of the present invention and illustrating a relationship between functional blocks of the exemplary communication device in accordance with embodiments of the present invention.
Figure 2B:
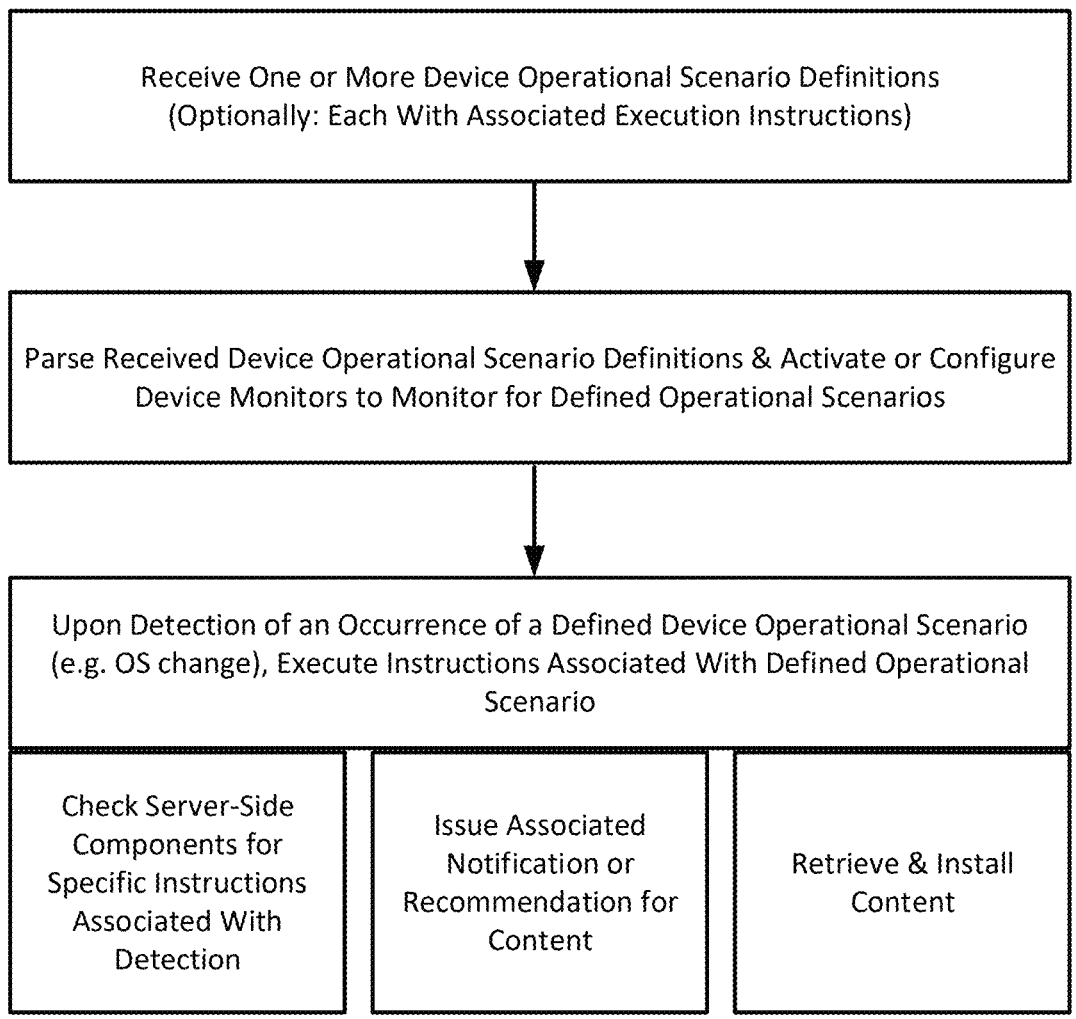
FIG. 2B is a flowchart including exemplary steps of functions performed by an exemplary mobile communication device according to embodiments of the present invention.

FIG. 2A is a functional block diagram of a communication device according to embodiments of the present invention and illustrating a relationship between functional blocks of the exemplary communication device in accordance with embodiments of the present invention. The device includes communication and computing circuits, and on the computing circuits a client-side system components. The client-side system components include a system manager which communicates through the communication circuits with one or more system servers. The client-side components also include configurable device operational scenario monitors, a content/notification module and a content installer. The device of FIG. 2A may operate in according the flow shown in FIG. 2B, which figure shows a flowchart including exemplary steps of functions performed by an exemplary mobile communication device according to embodiments of the present invention. More specifically, the client-side system manager, or functionally associated module, may receive one or more device operational scenario definitions, in the form of a file or data-structure, and may parse the definitions to determine which device monitors, optionally including monitoring routines, to activate and/or to configure. Once an occurrence of a specific defined scenario is detected by a monitor or monitoring routine, the client-side system manager, or functionally associated module, may execute instructions associated with the specific scenario. The instructions may have been sent with the scenario definition and/or subsequently downloaded from the system server(s). The instructions to be executed upon a scenario occurrence may include or point to specific content. The instructions may either present to a device user some associated content (notification), recommend to the device user to download/install specific content, and/or may automatically download to the device specific content.

One example of a device operational scenario is that the available storage on the device falls below a certain value and the user fails in installing another software application. Exemplary corresponding instructions in this case could be to present/notify the user with content suggesting a cloud storage solution which will free up space on their device. The digital content may be an ad for the cloud storage solution. Alternatively, instructions in this case could be to install and run a compression application on the device.

Another exemplary device operational scenario would be the device arrives at a geolocation known to the system to be an airport and the device remains there for period indicating an upcoming flight/departure to destinations unknown. The corresponding instructions for execution in this case could be to download content prior to take-off and to automatically present the download content upon landing. This scenario/content combination may be useful in cases when the device user travels to a location where they will not have network connectivity.

Figure 3A:
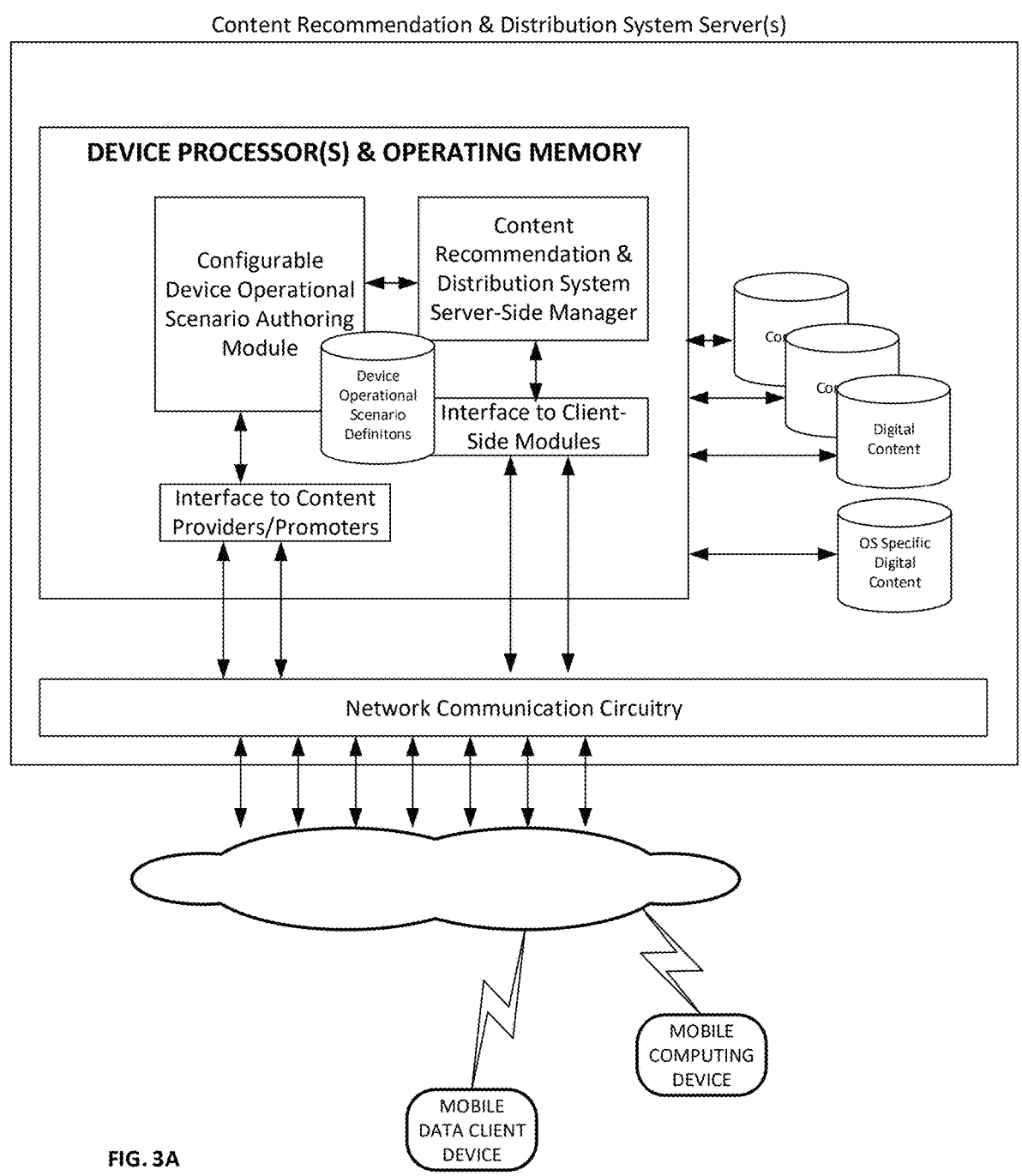
FIG. 3A is a functional block diagram of an exemplary recommendation/distribution server(s) according to embodiments of the present invention and illustrating a relationship between functional blocks of exemplary content recommendation and distribution server according to embodiments of the present invention.
Figure 3B:
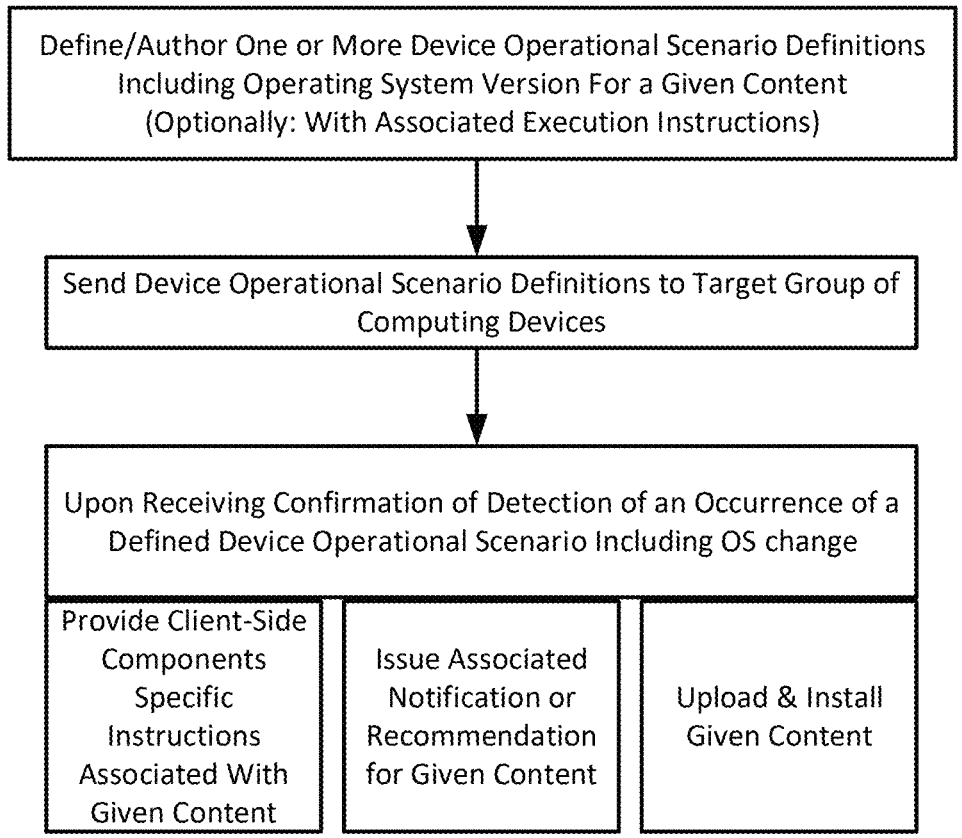
FIG. 3B is a flowchart including exemplary steps of functions performed by exemplary content recommendation and distribution server(s) according to embodiments of the present invention.

Turning now to FIG. 3A, there is shown a functional block diagram of exemplary recommendation/distribution server(s) according to embodiments of the present invention and illustrating a relationship between functional blocks of exemplary content recommendation and distribution server according to embodiments of the present invention. The operation of the server(s) may be described in conjunction with the flowchart of FIG. 3B, which flowchart includes exemplary steps of functions performed by exemplary content recommendation and distribution server(s) according to embodiments of the present invention. The server-side components include a device operational scenario authoring module to allow a provider or promotor of specific content to script a device operational scenario definition which may indicate a suitable scenario in which to recommend or otherwise provide the specific content. The script may include a listing of actions/instruction to execute upon a detection of the defined scenario occurring on a target device. The script may include and/or point (e.g. an internet link) to the specific content which the script is intended to recommend, provide or install. Interface a provide to the authoring module. The server(s) also include interface to the client-side component or modules via a data packet network. There are also provided data stores including content to be sent to the communication devices.

Turning now to FIG. 4A, there shown a diagram of a system information flow and content flow according to a specific embodiment of the present invention referred to as AppCloud CMS. The system embodiment of FIG. 4A shows the content distribution/management system segmented into an AppCloud catalog of content, and into a decision engine which is in communication with several devices which receive content from the CMS. FIG. 4B shows a set of exemplary device screens presented in accordance with certain embodiments of the present invention, including those associated with the AppCloud CMS.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A content recommendation system for providing each of a set of mobile client devices with operating system (OS) version specific application recommendations, said system comprising:
a content server, comprising:
server-side network communication circuitry communicatively coupled to a data packet network and
a server-side processor running one or more server-side software components, which cause the server-side processor to receive: (a) an inventory of applications installed on one or more of said set of mobile client devices; and (b) notifications of detected OS changes occurring on one or more of the set of mobile client devices; and
at least one mobile client device within the set and comprising:
client-side network communication circuitry communicatively coupled to the data packet network and
a client-side processor running a client-side software component configured to: (a) detect when an operating system (OS) version of said at least one mobile client device is changed and detect an occurrence of at least one additional condition selected from: said at least one mobile client device is: i) picked up, ii) placed down, and iii) located proximate to a specific location; and (b) upon detecting that the OS version of said at least one mobile client device is changed and the occurrence of the at least one additional condition, notify said content server that the OS version of said at least one mobile client device is changed,
wherein the client-side processor is configured to report one or more items of ancillary information to the content server including an application inventory of the at least one mobile client device;
wherein said server-side processor is configured to receive an update notification from the client-side processor that the OS version of said at least one mobile client device has changed and to generate an application recommendation to said at least one mobile client device responsively to the update notification, to the one or more reported items of ancillary information, and to the inventory of applications installed on said at least one mobile client device.

2. The content recommendation system according to claim 1, wherein said content server comprises a memory storing a listing of recommendable software applications, including multiple versions of the same application parsed by OS version compatibility, and for each recommendable software application, a listing of added features or feature improvements corresponding with different client device operating system versions.

3. The content recommendation system according to claim 2, wherein upon receiving the update notification indicating that the operating system version of the at least one mobile client device has been changed to a new OS version, the server-side processor compares the new OS version against the listing of recommendable software applications to find applications with new or improved functionality associated with the new OS version.

4. The content recommendation system according to claim 1, wherein the server-side processor is configured to identify, in response to the update notification, an application or application version with specific suitability to the changed OS version and to generate the application recommendation with respect to the identified application or application version.

5. The content recommendation system according to claim 1, wherein the client-side processor is configured to periodically check and update a record of the OS version in a memory of said at least one mobile client device and to send the update notification upon identifying a change in the record.

6. The content recommendation system according to claim 1, wherein the client-side processor is configured to detect and notify said content server of a backward change in the OS version of said at least one mobile client device, and the server-side processor is configured to recommend an older version of a software application responsively to the backward change.

7. A method for providing each of a set of mobile client devices with operating system (OS) version specific application recommendations, said method comprising:
detecting, by a client-side software component running on at least one mobile client device in the set, (a) a change in an OS version of said at least one mobile client device, and (b) an occurrence of at least one additional condition selected from: said at least one mobile client device is: i) picked up, ii) placed down, and iii) located proximate to a specific location;
responsive to the detecting, transmitting a notification of the change in the OS version from the at least one mobile client device via a data packet network to a content server, which maintains an inventory of applications installed on the mobile client devices in the set;
reporting from the at least one mobile client device to the content server one or more items of ancillary information including an application inventory of the at least one mobile client device;
in response to the notification of the change, receiving at the at least one mobile client device via the data packet network an application recommendation from the content server identifying an application or application version with specific suitability to the OS version based on the inventory of applications installed on said at least one mobile client device and on the one or more reported items of ancillary information; and
installing the identified application or application version on the at least one mobile client device.

8. The method according to claim 7, and comprising storing on the content server a listing of recommendable software applications, including multiple versions of the same application parsed by OS version compatibility, and for each recommendable software application, a listing of added features or feature improvements corresponding with different client device operating system versions.

9. The method according to claim 8, and comprising receiving the notification at the server indicating that the OS version of the at least one mobile client device has been changed to a new OS version, and comparing the new OS version against the listing of recommendable software applications to find applications with new or improved functionality associated with the new OS version.

10. The method according to claim 7, wherein transmitting the notification comprises periodically checking and updating a record of the OS version in a memory of said at least one mobile client device and sending the update notification upon identifying a change in the record.

11. The method according to claim 7, wherein transmitting the notification comprises detecting and notifying said content server of a backward change in the OS version of said at least one mobile client device, and wherein receiving the application recommendation comprises receiving an identification an older version of a software application for installation in response to the backward change.

12. A non-transitory computer-readable medium storing a set of instructions that, when executed by one or more computer processors cause the one or more computer processors to perform operations, the operations comprising:
detecting (a) a change in an OS version of a mobile client device of a set of mobile client devices, and (b) an occurrence of at least one additional condition selected from: said at least one mobile client device is: i) picked up, ii) placed down, and iii) located proximate to a specific location;
responsive to the detecting, transmitting a notification of the change in the OS version from the mobile client device via a data packet network to a content server, which maintains an inventory of applications installed on the mobile client devices in the set;
reporting from the at least one mobile client device to the content server one or more items of ancillary information including an application inventory of the at least one mobile client device;
based on the notification of the change, receiving at the mobile client device via the data packet network an application recommendation from the content server identifying an application or application version with specific suitability to the OS version based on the inventory of applications installed on the mobile client device and on the one or more reported items of ancillary information; and installing the identified application or application version on the at least one mobile client device.

13. The non-transitory computer-readable storage medium according to claim 12, wherein the content server stores a listing of recommendable software applications, including multiple versions of the same application parsed by OS version compatibility, and for each recommendable software application, a listing of added features or feature improvements corresponding with different client device operating system versions.

14. The non-transitory computer-readable storage medium according to claim 13, wherein upon receiving the notification at the server indicating that the OS version of the mobile client device has been changed to a new OS version, the server compares the new OS version against the listing of recommendable software applications to find applications with new or improved functionality associated with the new OS version.

15. The non-transitory computer-readable storage medium according to claim 12, wherein the instructions cause the one or more to processors periodically check and update a record of the OS version in a memory of the mobile client device and to send the update notification upon identifying a change in the record.

16. The non-transitory computer-readable storage medium according to claim 12, wherein the instructions cause the one or more processors to detect and notify the content server of a backward change in the OS version of the mobile client device, and wherein the application recommendation identifies an older version of a software application for installation in response to the backward change.

17. The non-transitory computer-readable storage medium according to claim 12, wherein the instructions cause the one or more processors to identify, in response to the notification, an application or application version with specific suitability to the changed OS version and to generate the application recommendation with respect to the identified application or application version.

18. The system according to claim 1, wherein the one or more reported items of ancillary information include the available storage on the at least one mobile client device.

19. The system according to claim 1, wherein the one or more reported items of ancillary information include the make and model of the at least one mobile client device.

20. The system according to claim 1, wherein the one or more reported items of ancillary information include the operational status of the at least one mobile client device.

* * * * *